J. J. Marki,
Liquid Cooler.
N° 97,540. Patented Dec. 7, 1869.
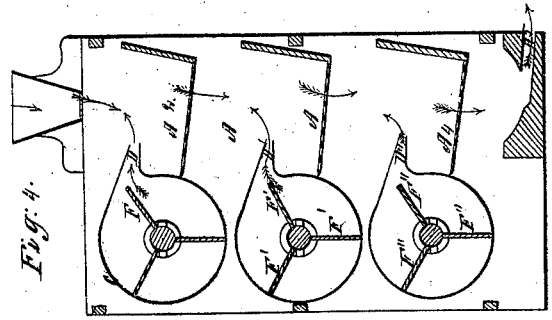
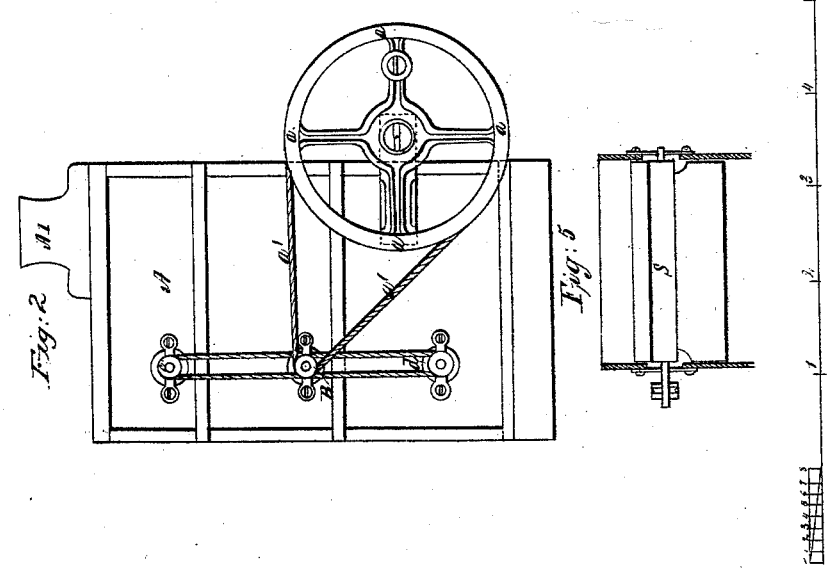
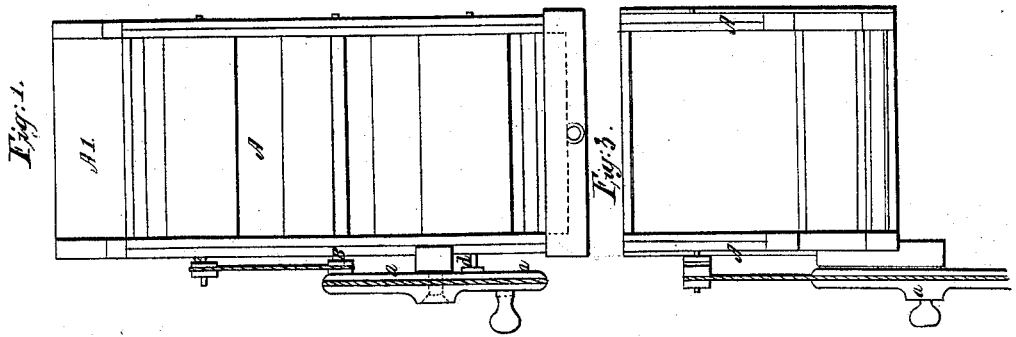
Witnesses:
John Liman
Philipp Brennan
Inventor
Th. Jakob Marki

United States Patent Office.

JOHN JACOB MÄRKI, OF RICHMOND, INDIANA.

Letters Patent No. 97,540, dated December 7, 1869.

IMPROVED COOLER FOR BEER AND OTHER LIQUIDS.

The Schedule referred to in these Letters Patent and making part of the same.

*To all whom it may concern:*

Be it known that I, JOHN JACOB MÄRKI, of Richmond, in the county of Wayne, and State of Indiana, have invented new and useful Improvements in Liquid-Coolers; and I do hereby declare that the following is a full and complete description of the construction and operation of the same, reference being had to the accompanying drawings, making part of this specification, in which—

Figure 1 is a front view,
Figure 2 is a side view,
Figure 3 is a ground plan,
Figure 4 is a vertical section, and
Figure 5, a section of the fan.

My invention relates to a device for cooling liquids, and consists of a frame-work, A, which affords support to the apparatus for that purpose.

This consists of a series of perforated receptacles, into which the liquid to be cooled is received in a heated state, and from which it is discharged in minute streams, which break up into minute drops, like rain, and through which falling drops, a current of cold air is caused to pass, thus carrying off the superfluous heat, and reducing the liquid to the temperature of the blast.

$A^1$, in fig. 4, shows a receptacle, into which the heated liquid is received, the same part being represented by the same sign in the other figures.

This receptacle has a bottom, perforated with small holes, through which the liquid passes in a finely-divided state, like rain-drops, and falls into another like receptacle, $A^2$, beneath.

F represents a fan-wheel, having wings like a common blower, and enclosed in the fan-case C, the opening for the blast looking toward the falling drops of liquid below the perforated bottom of $A^1$, and through which the blast passes, having its exit at D.

The falling liquid is received in the perforated receptacle $A^2$, where it receives the second cooling-blast from the fan-wheel $F^1$, the blast passing out at the opening D'.

From the perforated receptacle $A^2$, the liquid falls into the perforated receptacle $A^3$, where it is exposed to another cooling-blast from the fan $F^2$, whence it falls into the perforated receptacle $A^4$, and is discharged through the spout $A^5$, beneath.

These perforated receptacles may be multiplied to any desired extent, until the liquid is reduced to the temperature of the air forming the blast.

All the fans are put in revolution by the driving-wheel $a$, and band $a'$, or in any other convenient manner, the object being to expose the liquid to a series of cold-air blasts, when in a finely-divided state, caused by its passage through the perforated receptacles.

In this improvement, I do not confine myself to the precise form of apparatus herein described and shown, but can vary the form of the apparatus to any desired extent, so long as I preserve the leading features of the invention.

What I claim as my improvement, and desire to secure by Letters Patent, is—

The combination of a series of perforated pans with a series of blowers, operating substantially as described.

JOHN JACOB MÄRKI.

Witnesses:
VICTOR HAGMANN,
T. X. KOEHLER.